(12) United States Patent
Dewey

(10) Patent No.: US 7,739,462 B2
(45) Date of Patent: Jun. 15, 2010

(54) POLICY BASED DATA SHREDDING FOR STORAGE CONTROLLER

(75) Inventor: Douglas W Dewey, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 11/063,809

(22) Filed: Feb. 23, 2005

(65) Prior Publication Data

US 2006/0200357 A1 Sep. 7, 2006

(51) Int. Cl.
 G06F 12/00 (2006.01)
 G06F 13/00 (2006.01)
 G06F 13/28 (2006.01)

(52) U.S. Cl. ...................................................... 711/159
(58) Field of Classification Search ........................ None
 See application file for complete search history.

(56) References Cited

U.S. PATENT DOCUMENTS

| | | | | |
|---|---|---|---|---|
| 3,192,102 | A * | 6/1965 | Nolan | 162/24 |
| 5,450,609 | A * | 9/1995 | Schultz et al. | 711/114 |
| 5,463,765 | A * | 10/1995 | Kakuta et al. | 714/6 |
| 5,996,046 | A * | 11/1999 | Yagisawa et al. | 711/114 |
| 6,202,124 | B1 | 3/2001 | Kern et al. | |
| 6,338,114 | B1 * | 1/2002 | Paulsen et al. | 711/112 |
| 6,507,911 | B1 * | 1/2003 | Langford | 713/193 |
| 6,557,140 | B2 * | 4/2003 | Kakuta et al. | 714/769 |
| 2002/0103980 | A1 | 8/2002 | Crockett et al. | |
| 2002/0199059 | A1 * | 12/2002 | Riedle et al. | 711/114 |
| 2003/0065656 | A1 | 4/2003 | de la Torre et al. | |
| 2003/0079078 | A1 | 4/2003 | Zipprich et al. | |
| 2003/0135808 | A1 * | 7/2003 | Kakuta et al. | 714/768 |
| 2003/0196036 | A1 * | 10/2003 | Gibble et al. | 711/111 |
| 2004/0010661 | A1 * | 1/2004 | Katsuragi et al. | 711/114 |
| 2005/0154582 | A1 * | 7/2005 | Kortenoeven et al. | 704/200 |

OTHER PUBLICATIONS http://web.archive.org/web/20000920042117/http://www.ecs.umass.edu/ece/koren/architecture/Raid/basicRAID.html; Sep. 20, 2000; pp. 6.*
http://web.archive.org/web/20011019034654/scsi.radified.com/scsi_01.htm; Oct. 19, 2001; pp. 4.*

(Continued)

Primary Examiner—Matt Kim
Assistant Examiner—Christopher D Birkhimer
(74) Attorney, Agent, or Firm—Dan Shifrin

(57) ABSTRACT

Policy based data shredding is provided to be executed in a storage controller. A logical volume stored on media, such as magnetic disk drives, may be assigned one or more possible shredding policies. Storing and executing the policies in the controller is more efficient than performing host-based shredding and requires the use of less valuable bandwidth between the host and the controller. In addition, the controller is aware of failures, degradation and offline status of each drive in an array, and is able to thereby terminate or modify a shredding operation if necessary. Each policy includes the number of write passes to be performed on the media location in which the volume is stored and the pattern to write on the media location. The policy may also indicate whether to update a parity area during each of a plurality of write passes or only on the first.

31 Claims, 2 Drawing Sheets

OTHER PUBLICATIONS http://web.archive.org/web/20000902023412/http://www.pcguide.com/ref/hdd/perf/raid/concepts/perfDegraded-c.html; Sep. 2, 2000; pp. 2.* http://web.archive.org/web/20000920042117/http://www.ecs.umass.edu/ece/koren/architecture/Raid/basicRAID.html ; Sep. 20, 2000; pp. 6.* http://web.archive.org/web/20011019034654/scsi.radified.com/scsi_01.htm; Oct. 19, 2001; pp. 4.* http://web.archive.org/web/20000902023412/http://www.pcguide.com/ref/hdd/perf/raid/concepts/perfDegraded-c.html; Sep. 2, 2000; pp. 2.*

Glossary, Apr. 10, 2004, pp. 1-22 http://web.archive.org/web/20040410163202/http://docs.rinet.ru/NTServak/glossary.htm.*

Webopedia, "Interface", Mar. 17, 2003, pp. 1-3, http://www.webopedia.com/TERM/i/interface.html.*

Jeff Tyson, (How SCSI Works), Dec. 9, 2003, pp. 1-2, http://web.archive.org/web/20031209185444/http://www.howstuffworks.com/scsi.htm.*

Pastaman, (What Are The Advantages/Disadvantages Of USing SCSI), Aug. 12, 2003, pp. 1-7, http://www.answerbag.com/q_view/555.*

* cited by examiner

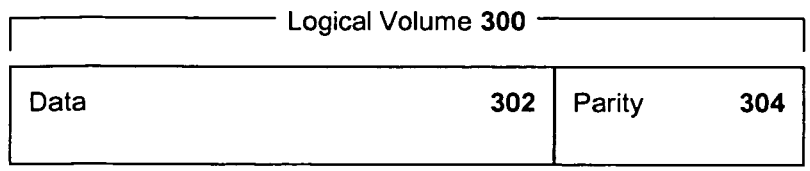
FIG. 3
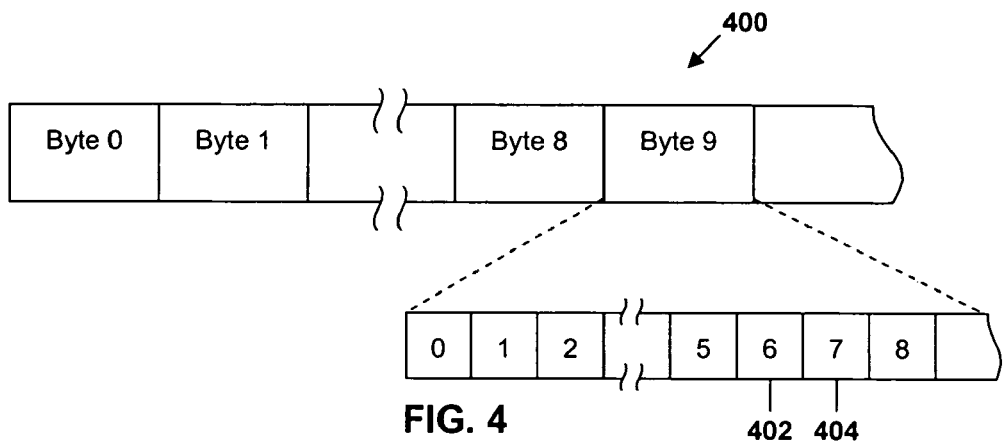
FIG. 4
| Value of Bits | Policy Handle |
|---|---|
| 0 0 | None - perform as write_verify |
| 0 1 | Use policy ABC - government standard |
| 1 0 | Use user defined policy |
| 1 1 | Use policy XYZ |
FIG. 5
| Value of Bits | Policy Handle |
|---|---|
| 0 0 | None - perform as write_verify |
| 0 1 | Write specified pattern 7 times |
| 1 0 | Write complement of data, then all 1's, then all 0's, then specified pattern 7 times |
| 1 1 | Write all 0's 4 times |
FIG. 6

POLICY BASED DATA SHREDDING FOR STORAGE CONTROLLER

TECHNICAL FIELD

The present invention relates generally to data destruction (shredding) and, in particular, to providing flexible, storage controller-based shredding policies.

BACKGROUND ART

Due to business, security, regulatory or governmental requirements, customer data which is stored but is obsolete or no longer needed may need to be securely erased or deleted in such a way as to be unrecoverable (known as data shredding). Shredding involves overwriting the areas of the physical media on which the customer data is stored. Overwriting typically replaces the data with one of a variety of bit patterns, such as all 0's, all 1's. Moreover, because errors may occur during an overwrite operation, some security protocols require more than one overwrite pass to ensure that no remnant of the original data remains. Thus, one governmental shredding policy requires that a specified pattern be written seven times. Another, more stringent, policy requires that the data be overwritten with its complement, then overwritten by all 1's, then overwritten by all 0's, and then finally overwritten by a specified pattern seven times. Other shredding policies are also in use and may vary by application and regulating authority.

In the past, tape drives and optical drives have implemented fixed commands which perform an overwrite or erase entire volumes in a fixed pattern. Newer data retention products, such as the IBM® Data Retention 450, are being based on magnetic disk drives and include servers (or hosts) and external disk controllers. FIG. 1 is a block diagram of an exemplary data retention device 100, including a host 110, a storage controller 120 and attached disk drives (which may comprise a RAID array) 130. Software 122 within the host 120 tracks which sectors of a logical volume are to be shredded and directs the execution of the shredding operation.

The fixed erase commands which have been used in the past to destroy data from tape and optical drives are not flexible enough to satisfy the newer and varying regulatory shredding requirements. Furthermore, in order to overwrite a data sector, the host must send the overwriting pattern to the storage controller as if it was actual data. In a network environment, transmission of such data uses expensive bandwidth.

Additionally, in a storage array 130, sectors of a logical volume are typically spread across multiple physical drives of the array 130. It may be that one of the drives is offline or in a degraded state, a situation which is known to the controller 120 but not to the host 110. In such an event, data on the offline or degraded drive remains unshredded although the host 110 believes that the shredding operation was successful.

Consequently, a need exists for a flexible shredding system which accommodates various shredding requirements, reduces bandwidth requirements and takes into account offline or degraded drives.

SUMMARY OF THE INVENTION

The present invention provides methods, systems, computer program products and methods for deploying computing infrastructure for policy based data shredding to be executed in a storage controller. A shredding policy is created for a volume stored in a location on a storage media in a storage device. The policy is stored in the controller which, upon receiving a command to shred the volume, executes the command according to the policy. The policy includes the number of write passes to be performed on the media location and the pattern to write on the media location. The policy may also indicate whether to update a parity area during each of a plurality of write passes or only on the first. A volume may be associated with any number of possible shredding policies; the shredding command from the host indicates which of the policies is to be performed.

In one embodiment, the shredding command is embedded in a SCSI write_verify command, such as by using vendor specific bits within a control byte of the write_verify command. The number of bits used is representative of the number of possible policies available to a volume.

Storing and executing the policies in the controller is more efficient than performing host-based shredding and requires less use of valuable bandwidth between the host and the controller. In addition, the controller is aware of failures, degradation and offline status of each drive in a storage array and is able to thereby terminate or modify a shredding operation if necessary.

BRIEF DESCRIPTION OF THE DRAWINGS

FIG. 3 is a representation of an exemplary logical volume;

FIG. 4 illustrates bits of a SCSI write_verify command which may be used as a shredding command;

FIG. 5 is a table of possible shredding policies selected based upon the value of the bits of the shredding command;

FIG. 6 is an alternative table of possible shredding policies selected based upon the value of the bits of the shredding command;

DETAILED DESCRIPTION OF THE PREFERRED EMBODIMENT

Figure 2:
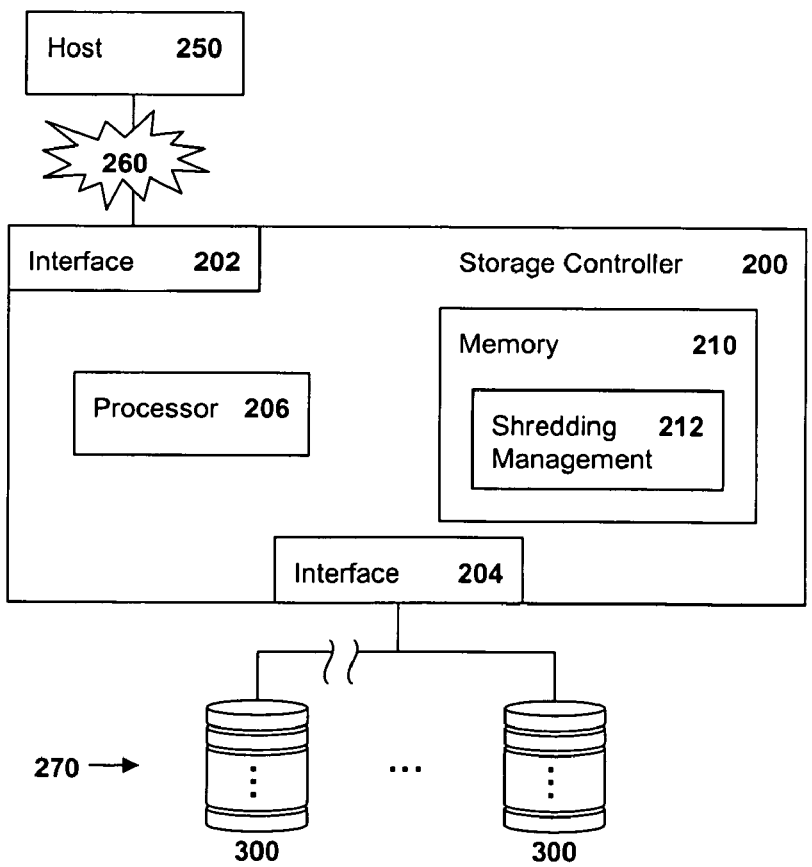
FIG. 2 is a block diagram of a storage controller in which shredding management of the present invention may be implemented.

FIG. 2 is a block diagram of a storage controller 200 in which shredding management of the present invention may be implemented. The controller 200 is attached through a host interface 202 to a host 250, directly or through a network 260. The controller is also attached through one or more device interfaces 204 to a disk drive or a RAID array 270. Data may be stored in a single drive in physical sectors representing logical volumes. In the array 270, the data of a logical volume 300 is stored in sectors spread across the individual drives. In both configurations, mapping of physical storage to logical volumes is maintained by the controller 200. FIG. 3 is a representation of the exemplary logical volume 300 having a data area 302 and a parity area 304. The controller 200 also includes a memory 210 in which software instructions are stored and a processor 206 operable to execute the instructions. Among the software instructions stored in the memory 210 is a shredding management module 212.

The shredding management module 212 includes a policy for each logical volume stored in the drives 270. A policy includes a parameter representing the number of overwrite passes to be performed while shredding the volume and a parameter representing a pattern with which to overwrite the original customer data. Some example of patterns include (without limitation): a security standard specified pattern used for governmental applications; all 0's; all 1's; the complement of the original customer data, followed by another pattern; the logical OR or exclusive-OR of the original customer data, followed by another pattern; or some other arbitrary pattern.

A policy may also include a parameter indicating what is to be done with the parity area 304. For example, a flag or other indicator may be set to a first state if the parity area is to be updated during each overwrite pass and set to a second state if the parity area is to be updated only during the first of the overwrite passes.

A policy may be assigned a number or descriptive name (hereinafter, the "policy handle"), thus allowing for the efficient identification of a number of policies. In one embodiment, each logical volume may have several possible shredding policies, identified by their respective handles. In operation, a command from the host 250 to the controller 200 to shred a volume may thus include the handle of the shredding policy which is to be executed by the controller 200. A two-bit shredding command will identify one of four possible shredding policies. In one embodiment, for example, in which the host 250 is attached to the controller 200 through a SCSI command interface, the shredding command may be embedded in two vendor specific bits (such as bits 6 and 7) 402 and 404 of the existing write_verify command 400. As illustrated in the table of FIG. 5, different combinations of the two bits represent four possible shredding policies available to be used on a volume. A different table may be used to designate the possible shredding policies available for each logical volume. The table may refer to predefined policies (FIG. 5) or may define the policy through entries (FIG. 6) establishing the number of write passes to be performed, the pattern to write over the original data and, if desired, whether to perform one overwrite of the parity or perform more overwrites. It will be appreciated that a different number of bits may be used to provide for greater or fewer possible shredding policies and that other bits of the write_verify and other commands may be used to convey a policy selection from the host 250 to the controller 200. Moreover, the shredding management module 212 may provide an interface to allow a system administrator to define and store additional shredding policies.

Figure 1:
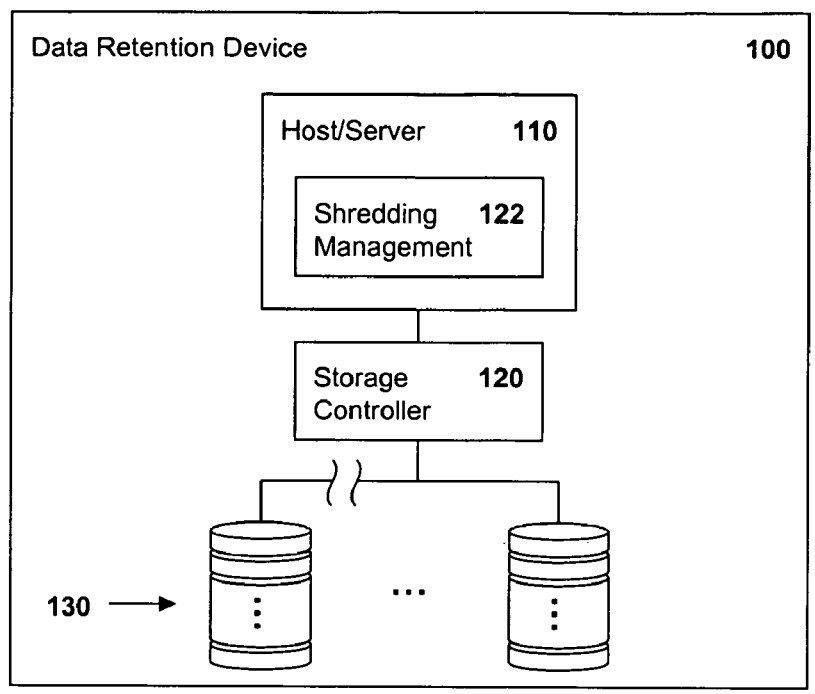
FIG. 1 is a block diagram of an exemplary data retention device.

In prior techniques, shredding a volume required the host 110 (FIG. 1) to transmit to the controller 120 a pattern with which to overwrite the original customer data. The pattern, in fact, was in the form of, and of the same size as, actual data and therefore required the same bandwidth for transmittal. Moreover, if the pattern was to be written more than once, it may have to have been transmitted multiple times, using still more bandwidth. By contrast, however, in the present invention, because the policies are stored in, and executed by, the controller 200, it is not necessary for valuable bandwidth to be used between the host 250 and the controller 200 for other than transmitting the single shredding command itself.

On occasion, the disk drive, or one of the drives of the array 270, may fail, may be in a degraded state, or be offline, a condition which is unknown to the host 250 but known to the controller 200. If shredding management was executed from the host 250, it might believe that the shredding operation was successful when, in fact, it had failed in whole or in part. The shredding management of the present invention being implemented in the controller 200, provides the controller 200 with the ability to acknowledge such a condition. For example, the controller 200 may, by default, terminate the shredding operation if the drive, or one of the drives, 270 on which data to be shredded is located is degraded or offline and notify the host 250 of the failure. Alternatively, the controller 200 may, by default, shred any data which is available and notify the host 250. As still another alternative, the shredding command may indicate which of the two (or other) operations is to be performed if the drive, or one of the drives, 270 is degraded or offline.

It is important to note that while the present invention has been described in the context of a fully functioning data processing system, those of ordinary skill in the art will appreciated that the processes of the present invention are capable of being distributed in the form of a computer readable medium of instructions and a variety of forms and that the present invention applies regardless of the particular type of signal bearing media actually used to carry out the distribution. Examples of computer readable storage media include recordable-type media such as a floppy disk, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to an apparatus, the need in the art may also be met by a method of managing shredding operations, a computer program product containing instructions for managing shredding operations, or a method for deploying computing infrastructure comprising integrating computer readable code into a computing system for managing shredding operations.

What is claimed is:

1. A method for shredding data stored on a storage drive, comprising:

designating a set of possible shredding policies for each of a plurality of volumes stored on a storage drive attached through a device interface to a storage controller, the storage controller having a host interface to which a host is attached;

creating a plurality of tables, each table storing a set of possible shredding policies;

associating each table with one of the volumes, each table comprising a plurality of entries for each possible shredding policy, including:

a first entry indicating a number of write passes to be performed on a location of the storage drive in which the associated volume is stored;

and a second entry indicating a pattern to write on the location of the storage drive in which the associated volume is stored;

storing each table in the storage controller;

receiving in the storage controller a command from the host to shred a designated volume according to a selected one of the shredding policies in the table associated with the designated volume, the policy being indicated in the shredding command;

accessing the associated table to obtain the number of write passes to be performed and the pattern to write on the location of the storage drive in which the designated volume is stored; and executing the shredding command in the storage controller to shred the designated volume according to the indicated policy.

2. The method of claim 1, wherein the plurality of entries for each possible shredding policy in each table further include a third entry comprising:
- a first flag set to a first state if parity areas of the associated volume are to be updated during each of a plurality of write passes; and set to a second state if parity areas of the associated volume are to be updated only during a first of the plurality of write passes.

3. The method of claim 1, wherein receiving the shredding command comprises receiving the shredding command through a SCSI command interface.

4. The method of claim 3, wherein the shredding command comprises fewer than all of the bits of a write_verify command.

5. The method of claim 4, wherein the shredding command comprises two bits, whereby the plurality of possible shredding policies is four.

6. The method of claim 4, wherein the shredding command comprises vendor specific bits within a control byte of the write_verify command.

7. The method of claim 1, wherein the plurality of entries for each possible shredding policy in each table further include a third entry, comprising:
- a second flag set to a first state if parity areas of the associated volume are to be updated during each of a plurality of write passes; and
- set to a second state if parity areas of the associated volume are to be updated only during a first of a plurality of write passes.

8. The method of claim 1, further comprising terminating execution of the shredding command if the storage device is in a degraded state.

9. The method of claim 1, further comprising shredding a portion of the designated volume if the storage drive is in a degraded state.

10. A storage controller, comprising:
- a host interface through which a host device is attached;
- a storage interface through which a storage drive is attached and on which a plurality of volumes are stored;
- a processor;
- a plurality of tables, each table associated with one of the plurality of volumes, each table storing a set of possible shredding policies and each table comprising a plurality of entries for each possible shredding policy, including:
  - a first entry indicating a number of write passes to be performed on a location on the storage drive in which the associated volume is stored; and
  - a second entry indicating a pattern to write on the location on the storage drive in which the associated volume is stored;
- shredding management software which, when executed by the processor, is operable to:
  - receive a command from the host device to shred a designated volume according to one of the plurality of shredding policies as indicated in the shredding command;
  - access the associated table to obtain the number of write passes to be performed and the pattern to write on the location of the storage drive in which the designated volume is stored; and
  - direct that the designated volume be shredded according to the indicated shredding policy.

11. The storage controller of claim 10, wherein the plurality of entries for each possible shredding policy further includes a third entry comprising:
- a first flag set to a first state if parity areas of the designated volume are to be updated during each of a plurality of write passes; and
- set to a second state if parity areas of the designated volume are to be updated only during a first of a plurality of write passes.

12. The storage controller of claim 10, wherein the host interface comprises a SCSI command interface.

13. The storage controller of claim 12, wherein the shredding command comprises fewer than all of the bits of a write-verify command.

14. The storage controller of claim 13, wherein the shredding command comprises two bits, whereby the plurality of possible shredding policies is four.

15. The storage controller of claim 13, wherein the shredding command comprises vendor specific bits within a control byte of the write_verify command.

16. The storage controller of claim 10, wherein the plurality of entries for each possible shredding policy in each table further include a third entry, comprising:
- a second flag set to a first state if parity areas of the associated volume are to be updated during each of a plurality of write passes; and
- set to a second state if parity areas of the associated volume are to be updated only during a first of a plurality of write passes.

17. The storage controller of claim 10, further comprising terminating execution of the shredding command if the storage drive is in a degraded state.

18. The storage controller of claim 10, further comprising shredding a portion of the designated volume if the storage drive is in a degraded state.

19. A computer program product of a computer readable storage medium usable with a programmable computer, the computer program product having computer-readable code embodied therein for shredding data stored on a storage media, the computer-readable code comprising instructions for:
- designating a set of possible shredding policies for each of a plurality of volumes stored in a location on a storage drive attached through a device interface to a storage controller, the storage controller having a host interface to which a host is attached;
- creating a plurality of tables, each table storing a set of possible shredding policies;
- associating each table with one of the volumes, each table comprising a plurality of entries for each possible shredding policy, including:
  - a first entry indicating a number of write passes to be performed on the location of the storage drive in which the associated volume is stored; and
  - a second entry indicating a pattern to write on the location of the storage drive;
- storing each table in the storage controller;
- receiving in the storage controller a command from the host to shred a designated volume according to a selected one of the shredding policies in the table associated with the designated volume, the policy being indicated in the shredding command;
- accessing the associated table to obtain the number of write passes to be performed and the pattern to write on the location of the storage drive in which the designated volume is stored; and
- executing the shredding command in the storage controller to shred the designated volume according to the indicated policy.

20. The computer program product of claim 19, wherein the plurality of entries for each possible shredding policy in each table further include a third entry comprising:
a first flag set to a first state if parity areas of the associated volume are to be updated during each of a plurality of write passes; and
set to a second state if parity areas of the associated volume are to be updated only during a first of the plurality of write passes.

21. The computer program product of claim 19, wherein the instructions for receiving the shredding command comprise instructions for receiving the shredding command through a SCSI command interface.

22. The computer program product of claim 21, wherein the shredding command comprises fewer than all of the bits of a write_verify command.

23. The computer program product of claim 22, wherein the shredding command comprises two bits, whereby the plurality of possible shredding policies is four.

24. The computer program product of claim 22, wherein the shredding command comprises vendor specific bits within a control byte of the write_verify command.

25. The computer program product of claim 19, wherein the plurality of entries for each possible shredding policy in each the table further include a third entry, comprising:
a second flag set to a first state if parity areas of the associated volume are to be updated during each of a plurality of write passes; and
set to a second state if parity areas of the associated volume are to be updated only during a first of a plurality of write passes.

26. The computer program product of claim 19, further comprising instructions for terminating execution of the shredding command if the storage drive is in a degraded state.

27. The computer program product of claim 19, further comprising instructions for shredding a portion of the designated volume if the storage drive is in a degraded state.

28. A method for deploying computing infrastructure, comprising integrating computer readable code into a computing system, wherein the code, in combination with the computing system, is capable of performing the following:
designating a set of possible shredding policies for each of a plurality of volumes stored in a location on a storage drive attached through a device interface to a storage controller, the storage controller having a host interface to which a host is attached;
creating a plurality of tables, each table storing a set of possible shredding policies;
associating each table with one of the volumes, each table comprising a plurality of entries for each possible shredding policy, including:
a first entry indicating a number of write passes to be performed on the location of the storage drive in which the associated volume is stored;
and
a second entry indicating a pattern to write on the location of the storage drive in which the associated volume is stored;
storing each table in the storage controller;
receiving in the storage controller a command from the host to shred a designated volume, according to a selected one of the shredding policies in the table associated with the designated volume, the policy being indicated in the shredding command;
accessing the associated table to obtain the number of write passes to be performed and the pattern to write on the location of the storage drive in which the designated volume is stored; and
executing the shredding command in the storage controller to shred the designated volume according to the policy indicated in the shredding command.

29. The method of claim 28, wherein the plurality of entries for each possible shredding policy in each table further includes:
a third parameter:
set to a first state if parity areas of the associated volume are to be updated during each of a plurality of write passes; and
set to a second state if parity areas of the associated volume are to be updated only during a first of a plurality of write passes.

30. The method of claim 28, further comprising selecting one operation from a group comprising terminating execution of the shredding command and shredding a portion of the designated volume if the storage drive is in a degraded state.

31. The method of claim 28, wherein the shredding command comprises fewer than all of the bits of a write_verify command.

* * * * *